United States Patent [19]
Yuhi

[11] Patent Number: 5,459,365
[45] Date of Patent: Oct. 17, 1995

[54] MINIATURE MOTOR

[75] Inventor: Toshiya Yuhi, Chiba, Japan

[73] Assignee: Mabuchi Motor Co., Ltd., Chiba, Japan

[21] Appl. No.: 304,539

[22] Filed: Sep. 12, 1994

[30] Foreign Application Priority Data

Oct. 20, 1993 [JP] Japan .................. 5-262032

[51] Int. Cl.$^6$ .................. H02K 23/00; H02K 5/00
[52] U.S. Cl. .................. 310/233; 310/40 MM; 310/42
[58] Field of Search .................. 310/173, 233, 310/235, 42, 40 MM

[56] References Cited

U.S. PATENT DOCUMENTS

| | | | |
|---|---|---|---|
| 4,228,376 | 10/1980 | Mabuchi | 310/242 |
| 4,662,827 | 5/1987 | Wiernicki | 417/363 |
| 4,668,888 | 5/1987 | Tamura et al. | 310/233 |
| 4,977,343 | 12/1990 | Wang | 310/42 |
| 4,978,874 | 12/1990 | Isozumi et al. | 310/83 |
| 5,113,105 | 5/1992 | Ikegami et al. | 310/233 |
| 5,157,299 | 10/1992 | Gerlach | 310/237 |
| 5,272,404 | 12/1993 | Yuhi et al. | 310/233 |
| 5,369,326 | 11/1994 | Strobl | 310/235 |

Primary Examiner—Thomas M. Dougherty
Attorney, Agent, or Firm—McGlew and Tuttle

[57] ABSTRACT

A miniature motor including a case formed into a bottomed hollow tubular shape having a permanent magnet, an end cap fitted to an open end of the case, and a rotor having an armature iron core and a commutator. A sleeve made of a resin material and formed into a hollow cylindrical shape is fitted coaxially with the core constituting the armature iron core and the commutator, with a gap provided on at least one end face of the sleeve; a plurality of grooves facing at least an end face of the sleeve are provided on the iron core and the commutator at certain spacings in the circumferential direction; a projection for press-fitting to any one of the grooves is provided each on both end faces of the sleeve integrally with the sleeve; and a groove extending along the axial line of the sleeve is provided in the middle part of these projections.

6 Claims, 5 Drawing Sheets

FIG. 3A (PRIOR ART)
FIG. 3B (PRIOR ART)
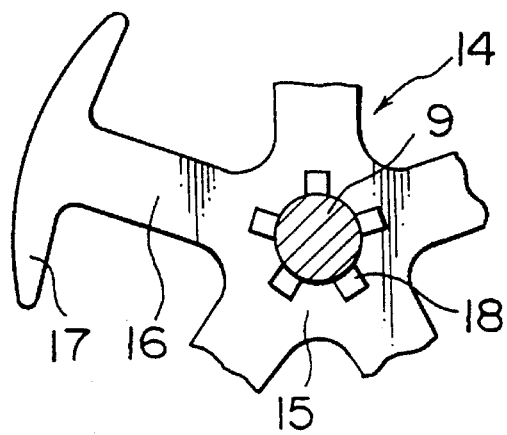
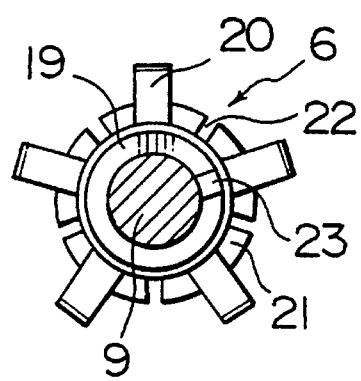
FIG. 4
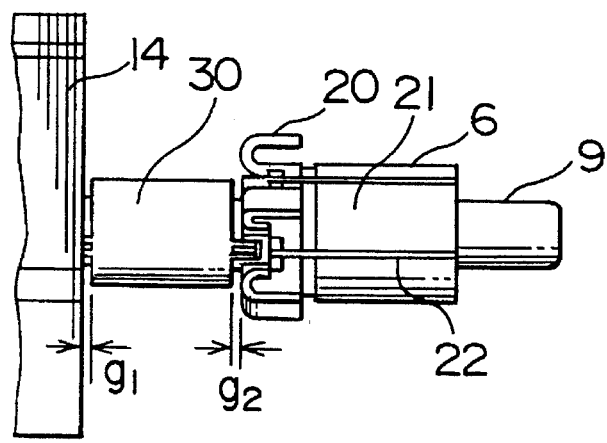
FIG. 5A
FIG. 5B
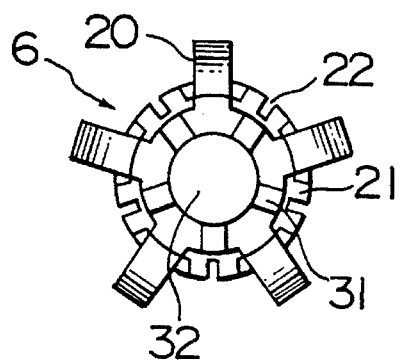
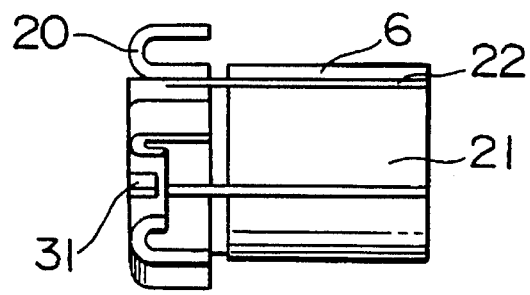

FIG. 6
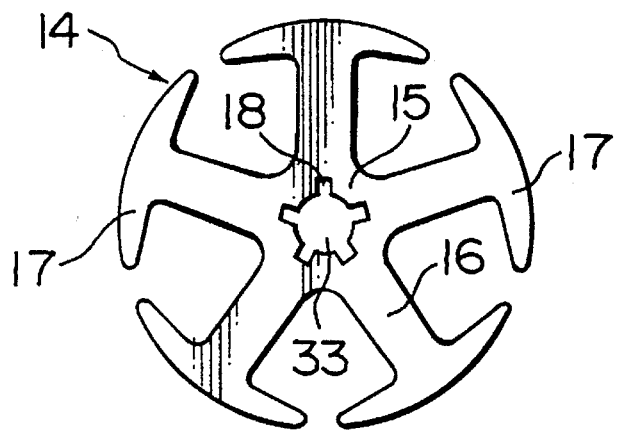
FIG. 7A  FIG. 7B
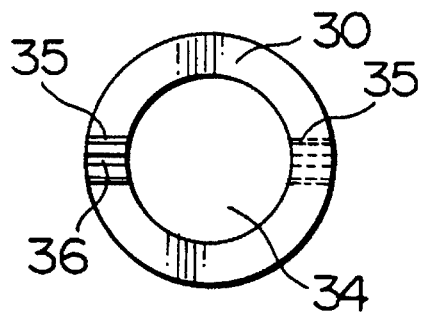 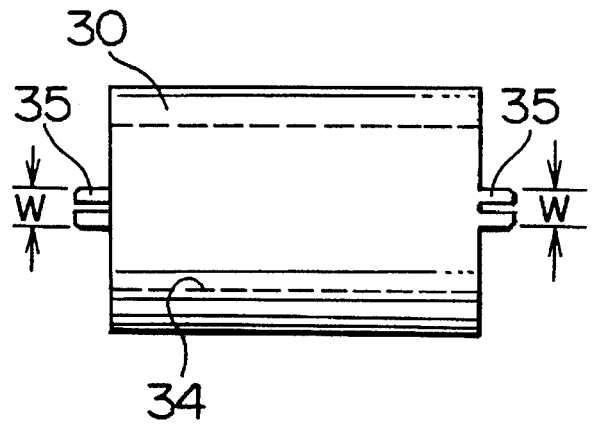
FIG. 8
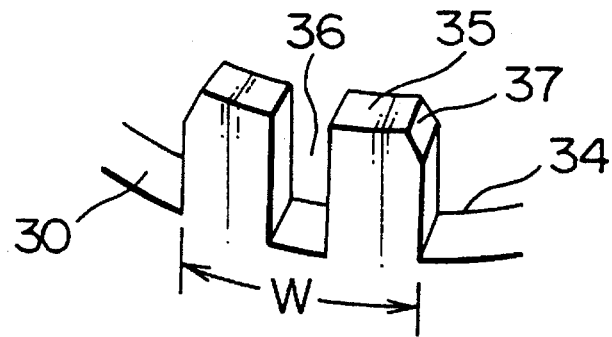

MINIATURE MOTOR

BACKGROUND OF THE INVENTION AND RELATED ART STATEMENT

This invention relates generally to a miniature motor used in power tools, for example, or more particularly to a miniature motor where the accuracy of positioning the circumferential relative positions of the core constituting the armature iron core and the commutator and the axial length accuracy of the rotor can be improved, and assembly operation is made easy.

FIG. 1 is a cross-sectional front view illustrating an example of the conventional type of miniature motor. In FIG. 1, numeral 1 refers to a case made of a metallic material, such as mild steel, formed into a bottomed hollow tubular shape, and having an arc-segment-shaped permanent magnet 2, for example, fixedly fitted to the inner circumferential surface thereof. Numeral 3 refers to an end cap made of a thermoplastic resin material, for example, and formed in such a manner as to fit to an open end of the case 1. Numeral 4 refers to a rotor comprising an armature iron core 5 facing the permanent magnet 2, and a commutator 6, and rotatably supported by bearings 7 and 8 each provided on the case 1 and the end cap 3, respectively. Numeral 9 refers to a shaft passing through the commutator 4.

Numeral 10 refers to a brush arm made of an electrically conductive material, formed into a strip shape, having at the free end thereof a brush 11 for making sliding contact with the outer circumferential surface of the commutator 6, and provided in the end cap 3. In the end cap 3 fixedly fitted with a set screw 13, for example, are a plurality of terminals 12 electrically connected to the brush arm 11. Electric power can be fed from an external power supply to windings of the armature iron core 5 via the terminal 12, the brush arm 10, the brush 11 and the commutator 6.

With the aforementioned construction, when electric current is fed to the windings of the armature iron core 5, rotating force is imparted to the rotor 4 placed in a magnetic field formed by the permanent magnet 2 fixedly fitted to the inner circumferential surface of the case 1, thereby causing the rotor 4 to rotate to drive a rotating power tool connected to the miniature motor via the shaft 9 integrally provided with the rotor 4.

FIG. 2 is an enlarged front view illustrating the vicinity of the commutator 6 in FIG. 1. FIGS. 3A and 3B are cross-sectional views taken along lines A—A and B—B in FIG. 2. Like parts are indicated by like numerals in FIG. 1 throughout. In FIGS. 2, and 3A and 3B, numeral 14 refers to a core formed by laminating thin iron sheets, for example, on which a winding (not shown) is wound to form an armature iron core. Numeral 15 refers to a boss part, 16 to an arm, 17 to a pole piece; all being integrally formed with each other. Numeral 18 refers to a groove provided on the boss part 15 at the same circumferential relative location as that of the arm 16. In FIGS. 2, 3A and 3B, five pieces each of the arm 16, the pole piece 17 and the groove 18 are provided at equal spacings in the circumferential direction.

Numeral 19 refers to a core member made of an insulating material and formed into a hollow cylindrical shape. A plurality of commutator segments 21 formed into an arc segment shape in cross section and having essentially U-shaped tongues 20 integrally provided on the side edges of the commutator segments 21 facing the core 14 are fixedly fitted to the outer circumferential surface of the core member 19 at equal spacings in the circumferential direction to form a commutator 6. Numeral 23 refers to a projection integrally provided with the core member 19 on the end face of the core member 10 on the side of the core 14 in such a manner that the projection 23 is press-fitted to any one of the grooves 18 provided on the core 14.

With the aforementioned construction, after the core 14 and the commutator 6 are fitted to the shaft 9, the relative circumferential position of the commutator 6 is positioned in such a fashion that the projection 23 engagingly matches with any one of the grooves 18 (see FIG. 3B) on the core 14 in FIG. 2, and then the projection 23 is press-fitted to the groove 18 until the end face of the core 14 comes in contact with that of the core member 19 of the commutator 6. By doing this, both members can be positioned and fixedly fitted to each other.

With the conventional type of miniature motor, the relative circumferential positions of the core 14 and the commutator 6 are maintained by press-fitting the projection 23 into the groove 18. However, since the width of the groove 18 and the projection 23 in the circumferential direction tends to have some variability even within a predetermined dimensional tolerance, the press-fitting allowance also tends to fluctuate. This makes it difficult to press-fit the projection 23 into the groove 18.

This would result in inadequate adhesion between the core 14 and the commutator 6, and failure of assembly in extreme cases. Furthermore, the side surface of the projection 23 may be chipped off by the side edge of the groove 18, or the projection 23 may be broken during the aforementioned press-fitting operation. The resulting entry of chips into the motor components, or deteriorated positioning accuracy could lower motor performance.

By providing a clearance between the groove 18 and the projection 23, the assembly operation can be facilitated, and the chipping of part of the projection 23 or the breaking of projection 23 can be prevented. This, however, causes a phase shift between the core 14 and the commutator 6, leading to variability in the performance and life of miniature motors.

The axial length L of the rotor 4 between the bearings 7 and 8 shown in FIG. 1 is determined by the sum of the axial dimensions of a washer 24 for adjusting the protruded dimensions of the shaft 9, a thrust-receiving bushing 25, and the core 14, the commutator 6 and an adjusting washer 26 constituting the armature iron core 5, and the errors of these dimensions tend to be further aggravated. To cope with this, troublesome operations are required to prepare several types of adjusting washers 26 having different thicknesses, and use them in varied combinations to adjust the length L.

SUMMARY OF THE INVENTION

It is the first object of this invention to provide a miniature motor in which the positioning accuracy of the relative circumferential positions of the core and commutator comprising an armature iron core can be improved.

It is the second object of this invention to provide a miniature motor in which the axial length accuracy of the rotor can be improved.

It is the third object of this invention to provide a miniature motor which can be easily assembled.

BRIEF DESCRIPTION OF THE DRAWINGS

FIGS. 3A and 3B are cross-sectional views taken along lines A—A and B—B, respectively, in FIG. 2.

FIG. 4 is a front view illustrating the essential part of the first embodiment of this invention.

FIGS. 5A and 5B are an enlarged left-hand end view and enlarged front view, respectively, illustrating the commutator shown in FIG. 4.

FIG. 6 is a right-hand side view illustrating the core shown in FIG. 4.

FIGS. 7A and 7B are an enlarged left-hand side view and enlarged front view, respectively, illustrating the sleeve shown in FIG. 4.

FIG. 8 is an enlarged perspective view illustrating the vicinity of the projection shown in FIGS. 7A and 7B.

DETAILED DESCRIPTION OF THE EMBODIMENTS

Figure 1:
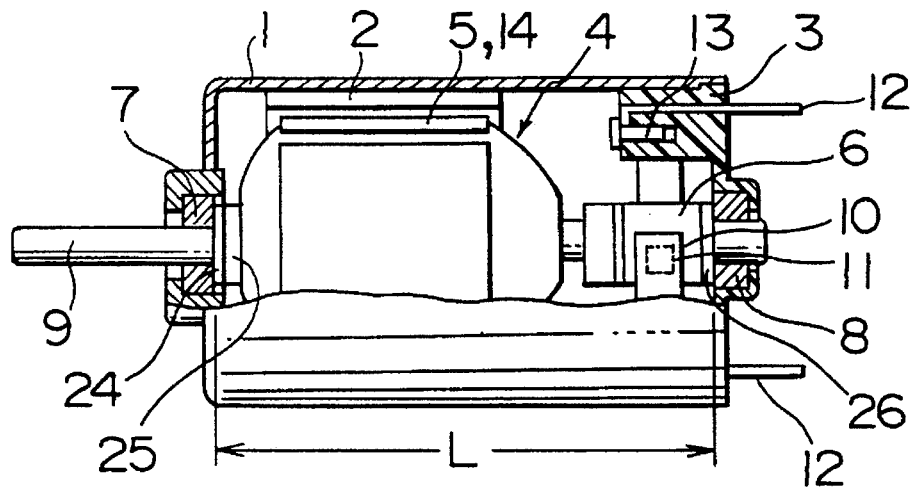
FIG. 1 is a cross-sectional front view of a conventional type of miniature motor.
Figure 2:
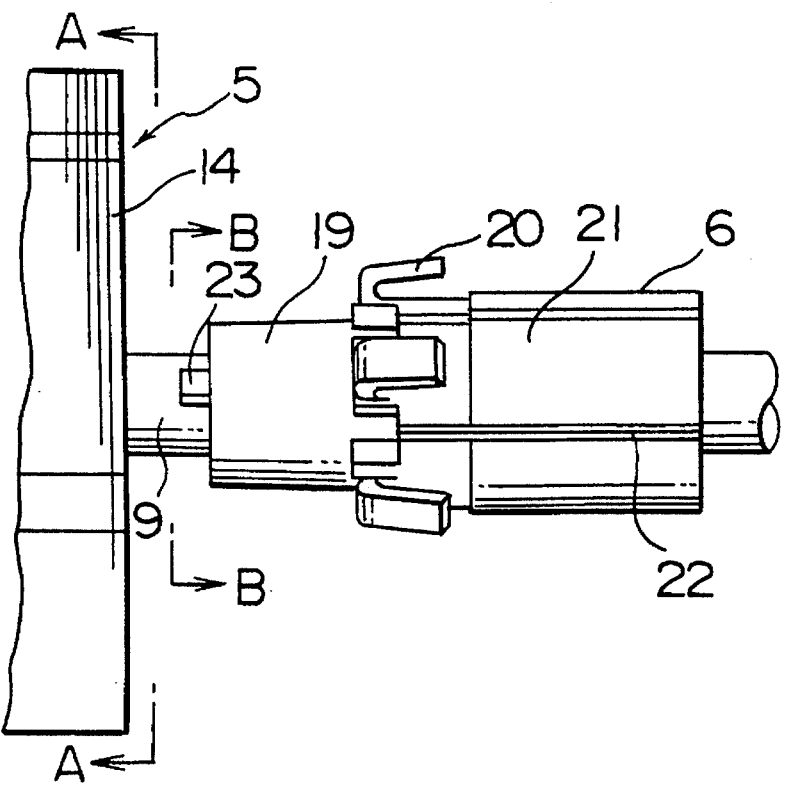
FIG. 2 is an enlarged front view illustrating the vicinity of the commutator 6 shown in FIG. 1.

FIG. 4 is a front view illustrating the first embodiment of this invention; FIGS. 5A and 5B are an enlarged left-hand side view and enlarged front view, respectively, illustrating the commutator in FIG. 4; FIG. 6 is a right-hand side view illustrating the core in FIG. 4; FIGS. 7A and 7B are an enlarged left-hand side view and enlarged front view, respectively, illustrating the sleeve in FIG. 4; and FIG. 8 is an enlarged perspective view illustrating the vicinity of the projection in FIGS. 7A and 7B. Like parts are indicated by like numerals shown in FIGS. 1 through 3A and 3B.

In FIG. 4, numeral 30 refers to a sleeve made of a thermoplastic resin material, for example, formed into a hollow cylindrical shape, as will be described later, and fitted between the core 14 and the commutator 6 with gaps $g_1$ and $g_2$ interposed between them. These gaps $g_1$ and $g_2$ can be provided on at least any one end face of the sleeve 30. In FIGS. 5A and 5B, a plurality of grooves 31 are provided on the same circumferential locations as those of the slits 22 on the left side of the commutator 6. Numeral 32 refers to a shaft hole. Numeral 33 also refers to a shaft hole in FIG. 6. The shaft hole 33, together with the shaft hole 32, is formed in such a manner that a shaft 9 shown in FIG. 4 can be inserted through it.

In FIGS. 7A, 7B and 8, a shaft hole 34 is provided on the sleeve 30 to accommodate the shaft 9 shown in FIG. 4. Numeral 35 refers to a projection integrally formed each on both end faces of the sleeve 30. The circumferential width W of the projection 35 is set so that the projection 35 can be press-fitted into the grooves 31 and 18 shown in FIGS. 5A, 5B and 6. A groove 36 is provided in the middle part of the projection 35 along the axial direction of the sleeve 30. Numeral 37 refers to a beveled part formed on the outside edge of the projection 35.

With the aforementioned construction, the core 14, the sleeve 30 and the commutator 6 are fitted to the shaft 9, as shown in FIG. 4, and the projections 35 and 35 provided on the sleeve 30 (see FIGS. 7A and 7B) are positioned so that each of the projections 35 matches with any one each of the grooves 31 and 18 each provided on the commutator 6 and the core 14 shown in FIGS. 5A, 5B and 6. Thus, the projections 35 and 35 can be easily press-fitted into any one each of the grooves 31 and 18, and as a result, the circumferential positioning and temporary assembly of the core 14 and the commutator 6 can be accomplished. The axial length of the rotor 4 shown in FIG. 1 can be easily set to a predetermined length by adjusting the gaps $g_1$ and $g_2$ ($g_1$ may not necessarily be equal to $g_2$) shown in FIG. 4. After the temporary assembly mentioned above, the sleeve 30, the core 14 and the commutator 6 are tightly bonded together by adhesive or other appropriate means, a predetermined amount of winding is wound on the core 14 and electrically connected to the commutator 6.

Figure 9:
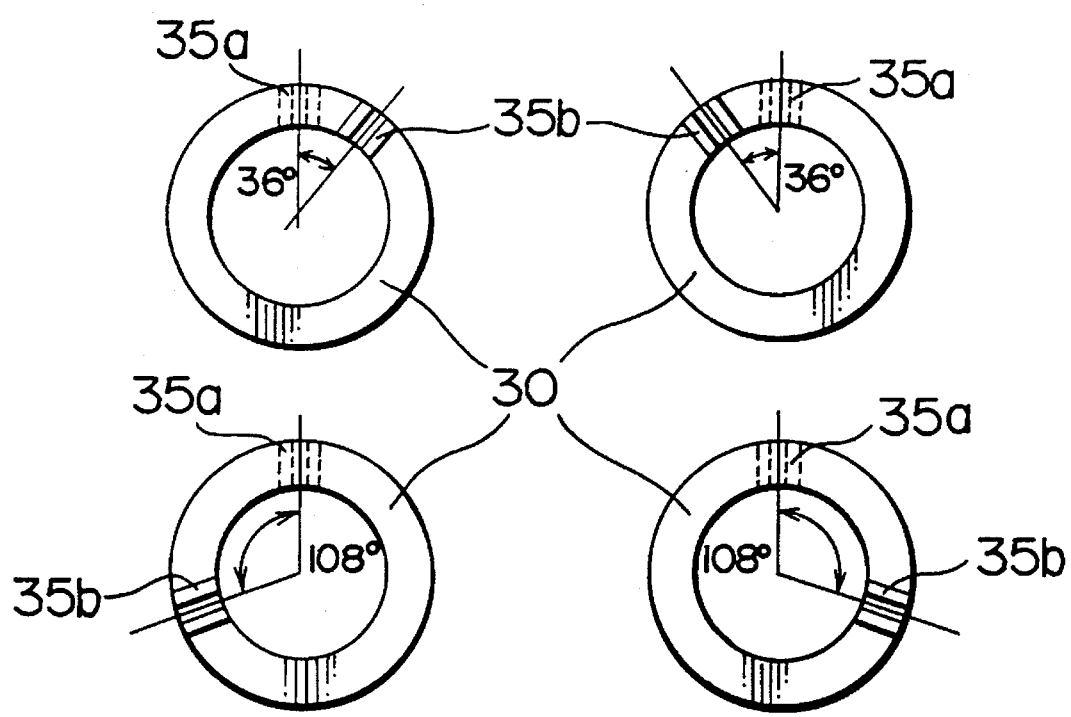
FIG. 9 is an end view illustrating possible relative positions of the projections 35 provided on both end faces of the sleeve 30 in FIGS. 7A and 7B.

FIG. 9 is an end view illustrating possible relative positions of the projections 35 provided on both end faces of the sleeve 30 shown in FIGS. 7A and 7B. In FIG. 9, a projection 35a shown by broken lines denotes one press-fitted into the uppermost groove 18 on the core 14 shown in FIG. 6, while a projection 35b shown by solid lines denotes one press-fitted into the groove 31 on the commutator 6 shown in FIGS. 5A and 5B. That is, even when the central angle between the relative positions of the projections 35a and 35b is set as shown in FIG. 9, aside from 180 degrees shown in FIG. 7A, the commutator 6 and the core 14 shown in FIGS. 5A, 5B and 6 can be positioned properly.

In an arrangement where the relationship between the grooves 31 and 18 provided on the commutator 6 and the core 14 shown in FIGS. 5A, 5B and 6 is such that the grooves 31 and 18 are located in the middle of each other, in the state projected on a plane orthogonally intersecting the motor axial line, the central angle between the relative positions of the projections 35a and 35b provided on the sleeve 30 shown in FIG. 9 for n pieces of grooves can be generally expressed as follows.

Let the clockwise central angle between the projection 35b and the projection 35a as the datum be $\omega$, and we have $$\omega = ((1+2m)/n) \times 180° \quad (1)$$

where m is any positive integer, including 0. Thus, the central angle can be set to any one of the values derived from this equation.

Figure 10A:
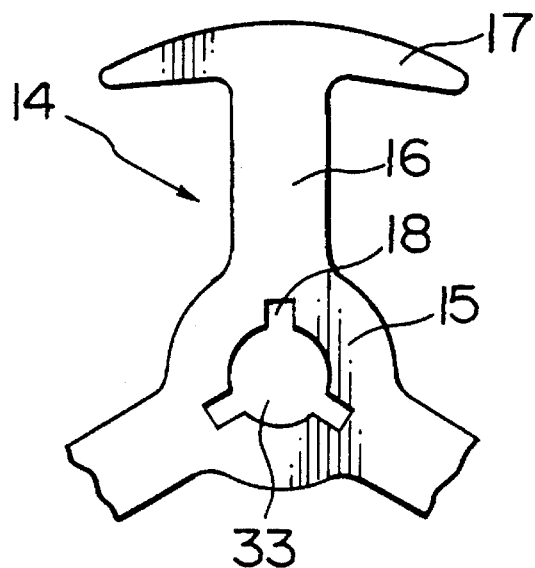
FIGS. 10A and 10B are an end view of the core, and an end view of the commutator in the second embodiment of this invention, respectively.
Figure 10B:
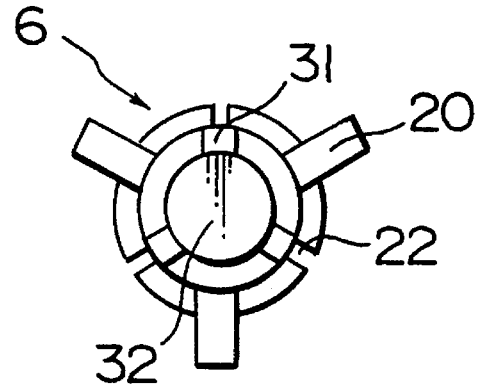

FIGS. 10A and 10B are end views illustrating the core and the commutator, respectively, in the second embodiment of this invention. Like parts are indicated by line numerals in FIGS. 5A, 5B and 6. FIGS. 10A and 10B show three pieces each of the grooves 18 and 31 disposed at the same circumferential relative positions. Even in this arrangement, the core 14 and the commutator 6 can be positioned by using the sleeve 30 shown in FIGS. 7A, 7B and 8.

Figure 11:
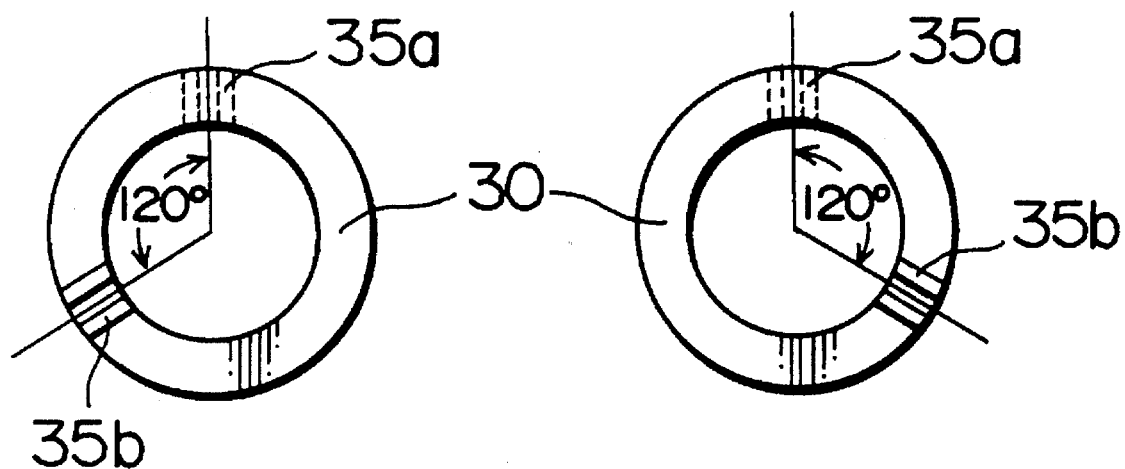
FIG. 11 is an end view illustrating an example of the sleeve 30 used for positioning the core 14 in FIG. 10A and the commutator 6 in FIG. 10B.

FIG. 11 is an end view illustrating an example of the sleeve 30 that can be used for positioning the core 14 and the commutator 6 shown in FIGS. 10A and 10B. Like parts are indicated by like numerals shown in FIG. 9. As is apparent from FIG. 11, the central angle between the relative positions of the projections 35a and 35b provided on the sleeve 30 in this arrangement is nothing but 120 degrees.

In an arrangement where there is a relationship between the grooves 18 and 31 as shown in FIGS. 10A and 10B, the central angle $\omega$ between the relative positions of the projections 35a and 35b provided on the sleeve 30 shown in FIG. 11 for n pieces of grooves can be obtained in the same manner as with the equation (1) above:

$$\omega = m/n \times 360° \quad (2)$$

Thus, the central angle can be set to any of the values derived from the equation (2).

Figure 12:
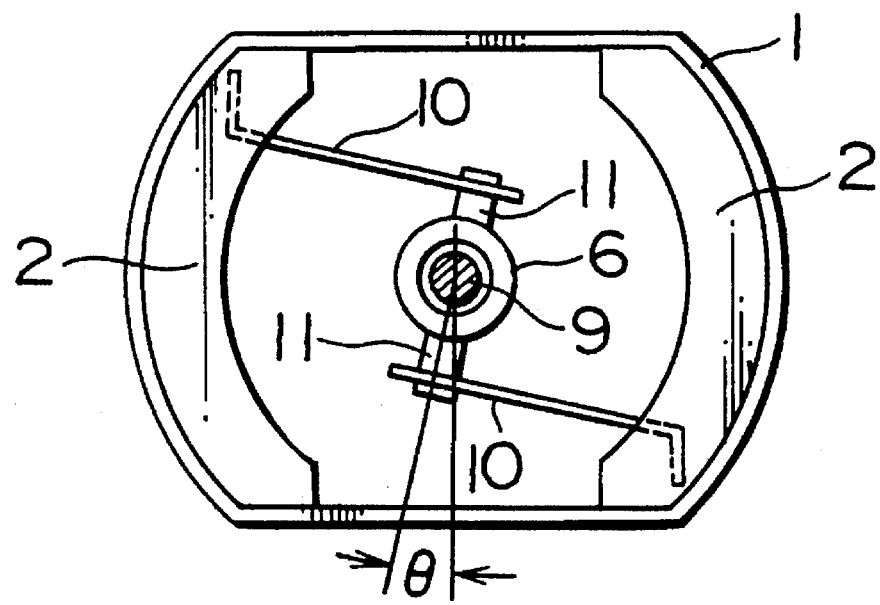
FIG. 12 is a cross-sectional view of the miniature motor in the third embodiment of this invention.

FIG. 12 is a cross-sectional view of the miniature motor in the third embodiment of this invention. Like parts are indicated by like numerals in FIG. 1. FIG. 12 shows the so-called "flat type" of miniature motor in which the outside shape of the case 1 is formed into a drum shape, with the distance across the sides of the case 1 coming in contact with the edges of the permanent magnets 2 and 2 in the case 1 being made smaller than the distance between the sides of the case 1 on the inside surface of which the permanent magnets 2 and 2 are fixedly fitted. In this type of miniature motor, the angle between a line connecting the centers of the brushes 11 and 11, and the central line between the permanent magnets 2 and 2 is set to θ, as shown in FIG. 12, to maintain the effective length of the brush arm 10 and electrical input to the armature.

This makes it necessary to provide a phase difference of θ between the rotor and the commutator (both not shown. See numerals 4 and 6 in FIG. 10). In other words, the phase of the commutator has to be advanced by θ in the clockwise direction in FIG. 12. In this type of miniature motor, the sleeve 30 as shown in FIGS. 9 and 11 can be used, but the central angle ω between the relative positions of the projections 35a and 35b in both figures must be set in the following manner.

$$\omega = ((1+2m)/n) \times 180° + \theta \quad (3)$$

$$\omega = m/n \times 360° + \theta \quad (4)$$

Although this embodiment shows an example where the central angle ω is set using as the datum the projection 35a press-fitted into the groove 18 on the core 14 in the profile of the projection 35 projected on a plane orthogonally intersecting the motor axial line, the projection 35b press-fitted into the groove 31 of the commutator 6 can be used as the datum. The central angle ω can be set appropriately by setting the relative positions of cavities for molding the projections 35a and 35b in a metal die for molding the sleeve 30.

This invention having the aforementioned construction and operation can accomplish the following effects.

(1) The accuracy in positioning the core and the armature, both constituting the armature, in the circumferential direction can be improved while preventing phase shift between both. Thus, a miniature motor having stabilized motor performance and life can be accomplished.

(2) The axial length accuracy of the rotor can be improved, and vibration and mechanical noise can be reduced because the axial clearance between the bearings can be reduced, (3) Since an elastic deformation function is imparted to the projections provided on both end faces of the sleeve, the core and the commutator can be assembled easily and positively.

(4) In reference to (3), generation of chips from the projection or the break of the projections, as heretofore has often been encountered during motor assembly, can be eliminated. This leads to improved productivity.

What is claimed is:

1. A miniature motor comprising a case made of a metallic material, formed into a bottomed hollow tubular shape and having permanent magnets fixedly fitted on the inner circumferential surface thereof, a rotor comprising an armature iron core facing said permanent magnets and a commutator, an end cap fitted to an open end of said case, and having brushes making sliding contact with said commutator and terminals electrically connected to said brushes; said rotor being rotatably supported via bearings provided on the bottom of said case and said end cap, a sleeve made of a resin material and formed into a hollow cylindrical shape, said sleeve being provided between a core constituting said armature iron core and said commutator, coaxially with said core and said commutator, with a gap provided on at least one end face of said sleeve; a plurality of grooves facing the end faces of said sleeve being provided on said core and said commutator at certain spacings; a projection for press-fitting into any one of said grooves being provided integrally with said sleeve, each on both end faces of said sleeve; and a groove extending along the axial line of said sleeve being provided in the middle part of said projection.

2. A miniature motor as set forth in claim 1 wherein said sleeve, said core and said commutator are bonded together by adhesive.

3. A miniature motor as set forth in claim 1 wherein n pieces each of said grooves provided on said core and said commutator are formed in such a manner that one set of said grooves are located in the middle of the other set of said grooves in the profile thereof projected on a plane orthogonally intersecting the motor axial line, and that a central angle between the positions of said projections provided on both end faces of said sleeve, in the profile thereof projected on said plane, is set as follows:

$$\omega = ((1+2m)/n) \times 180°$$

where m is any positive integer, including 0.

4. A miniature motor as set forth in claim 1 wherein n pieces each of said grooves provided on said core and said commutator are formed in such a manner that the circumferential relative positions of said grooves, in the profile thereof projected on a plane orthogonally intersecting the motor axial line, are aligned with each other, and that a central angle ω between the positions of said projections provided on both end faces of said sleeve, in the profile thereof projected on said plane, is set as follows:

$$\omega = m/n \times 360°$$

where m is any positive integer, including 0.

5. A miniature motor as set forth in claim 1 wherein when an angle between a line connecting the centers of a pair of brushes, and a center line between a pair of permanent magnets is set to θ, n pieces each of said grooves provided on said core and said commutator are formed in such a manner that one set of said grooves are located in the middle of the other set of said grooves, in the profile thereof projected on a plane orthogonally intersecting the motor axial line, and that a central angle ω between the positions of said projections provided on both end faces of said sleeve, in the profile thereof projected on said plane, is set as follows:

$$\omega = ((1+2m)/n) \times 180° + \theta$$

where m is any positive integer, including 0.

6. A miniature motor as set forth in claim 1 wherein when an angle between a line connecting the centers of a pair of brushes, and a center line between a pair of permanent magnets is set to $\theta$, n pieces each of said grooves provided on said core and said commutator are formed in such a manner that the circumferential relative positions of said grooves, in the profile thereof projected on a plane orthogonally intersecting the motor axial line, are aligned with each other, and that a central angle $\omega$ between the positions of said projections provided on both end faces of said sleeve, in the profile thereof projected on said plane, is set as follows:

$$\omega = m/n \times 360° + \theta$$

where m is any positive integer, including 0.

* * * * *

UNITED STATES PATENT AND TRADEMARK OFFICE
CERTIFICATE OF CORRECTION

PATENT NO. : 5,459,365
DATED : October 17, 1995
INVENTOR(S) : Toshiya Yuhi

It is certified that error appears in the above-identified patent and that said Letters Patent is hereby corrected as shown below:

Title page, item [73] inventor: should read--Toshiya Yuhi, Chiba-ken, Japan---.
Title page, item [75] assignee: should read--Mabuchi Motor, Co., Ltd., Japan--.

Signed and Sealed this

Nineteenth Day of December, 1995

Attest:

BRUCE LEHMAN

Attesting Officer     Commissioner of Patents and Trademarks